United States Patent [19]

Ogawa

[11] Patent Number: 5,682,201
[45] Date of Patent: Oct. 28, 1997

[54] METHOD AND DEVICE FOR GENERATING PIXEL SIGNALS

[75] Inventor: Kimiaki Ogawa, Itabashi-ku, Japan

[73] Assignee: Asahi Kogaku Kogyo Kabushiki Kaisha, Tokyo, Japan

[21] Appl. No.: 421,923

[22] Filed: Apr. 14, 1995

[30] Foreign Application Priority Data

Apr. 15, 1994 [JP] Japan .................................. 6-102244

[51] Int. Cl.⁶ .............................. H04N 9/73; H04N 5/335
[52] U.S. Cl. ..................... 348/224; 348/269; 348/279; 348/296; 348/298; 348/364; 348/371
[58] Field of Search ................................... 348/222, 224, 348/228, 229, 230, 294, 296, 298, 311, 320, 321.12, 323, 370, 371, 266, 267, 268, 269, 271, 272, 273, 279, 317, 362, 363, 364, 366; H04N 9/73, 5/335

[56] References Cited

U.S. PATENT DOCUMENTS

| | | |
|---|---|---|
| 4,710,807 | 12/1987 | Chikama .................................. 358/98 |
| 4,868,667 | 9/1989 | Tani et al. ................................ 358/228 |
| 5,097,340 | 3/1992 | Tanabe et al. ...................... 358/213.19 |
| 5,187,569 | 2/1993 | Tani .......................................... 358/50 |
| 5,216,511 | 6/1993 | Tani .................................... 358/213.16 |
| 5,341,220 | 8/1994 | Juen .......................................... 348/296 |

Primary Examiner—Thai Tran
Assistant Examiner—Ngoc-Yen Vu
Attorney, Agent, or Firm—Greenblum & Bernstein, P.L.C.

[57] ABSTRACT

A pixel signal generating device is provided with a color filter having a matrix arrangement, in which color filter elements for passing magenta light, green light, yellow light and cyan light are arranged in a regular manner. A first exposure is performed without radiating an electronic flash, and Ye- and Cy-signals are inputted into a second image memory. A second exposure is performed while radiating the electronic flash, and Mg- and G-signals are inputted into a first image memory. Without discharging electric charges accumulated on the CCD, a third exposure is performed without radiating the electronic flash, and Ye- and Cy-signals are generated. The Ye- and Cy-signals obtained by the first exposure and stored in the second image memory are subtracted from the Ye- and Cy-signals of the second and third exposure to form one image.

20 Claims, 13 Drawing Sheets

SWITCH "a" (STORING DATA OF $E_1$)

SWITCH "b" (STORING DATA OF $E_2+E_3-E_1$)

METHOD AND DEVICE FOR GENERATING PIXEL SIGNALS

BACKGROUND OF THE INVENTION

1. Field of the Invention

The present invention relates to a method and a device for generating pixel signals in accordance with electric charges accumulated on a solid state imaging device. More particularly the present invention relates to a device and a method suitable for performing a photographing operation while radiating an electronic flash.

2. Description of the Related Art

Conventionally, there is known an electronic still camera in which pixel signals accumulated on a solid state imaging device such as a CCD are read-out therefrom according to the interline transfer system. In the interline transfer system, all of the pixel signals generated on one CCD are divided into a first field, corresponding to horizontal scanning lines positioned on every other line, and a second field corresponding to horizontal scanning lines, each of which is positioned between the lines of the first field. First, the pixel signals of the first field are read-out from the CCD, and then, the pixel signals of the second field are read-out therefrom. In such a CCD, when photography is performed with an electronic flash and all the pixel signals are read out from the CCD, if the CCD is exposed while the first field pixel signals are being read-out, the second field pixel signals are overexposed. Therefore, it is necessary to provide a mechanism by which the CCD is shielded from light immediately after the electronic flash has been radiated.

If such a shielding mechanism is provided, however, the electronic still camera has a complex construction and is bulky, and further, the manufacturing cost will be high. Conversely, another electronic still camera is known where the shielding mechanism is not provided and the electronic flash is controlled to radiate during each field. According to this construction, since the electronic flash is radiated twice to obtain one photograph, the life of the battery, which is a power source, is short. Accordingly, the number of recordable frames that this construction can obtain is decreased due to the electronic flash. If the amount of light in the electronic flash per each radiation is reduced to preserve battery life, the guide number is lowered; that is, the distance to which the flash light will reach is unacceptably shortened.

SUMMARY OF THE INVENTION

Therefore, an object of the present invention is to provide a pixel signal generating method, by which the shielding mechanism is not needed and a photographing operation can be performed without lowering the guide number. Another object of the present invention is to provide a pixel signal generating device for performing the method.

According to the present invention, there is provided a device for generating pixel signals corresponding to two fields based on electric charges accumulated on an imaging device, the pixel signal generating device includes a first pixel signal outputting device, a second pixel signal outputting device, a third pixel signal outputting device, and a subtracting device.

The first pixel signal outputting device outputs pixel signals of one field by performing a first exposure in which the imaging device is exposed and during which an electronic flash is not radiated. The second pixel signal outputting device outputs pixel signals of one field by performing, after discharging electric charges accumulated on the imaging device, a second exposure during which the imaging device is exposed and the electronic flash is radiated. The third pixel signal outputting device outputs pixel signals of one field by performing, after the second exposure and without discharging electric charges accumulated on the imaging device, a third exposure in which the imaging device is exposed and during which the electronic flash is not radiated. The subtracting device subtracts pixel signals outputted by the first pixel signal outputting device from the pixel signals outputted by the third pixel signal outputting device, to generate pixel signals corresponding to one field. The pixel signals generated by the subtracting device are substantially equivalent to pixel signals obtained during an exposure in which an electronic flash is radiated.

Further, according to the present invention, there is provided a method for generating pixel signals corresponding to two fields based on electric charges accumulated on an imaging device, the pixel signal generating method comprising a first step through a fourth step.

In the first step, pixel signals of one field are outputted by performing a first exposure in which the imaging device is exposed and during which an electronic flash is not radiated. In a second step, pixel signals of one field are outputted by performing, after discharging electric charges accumulated on the imaging device, a second exposure during which the imaging device is exposed and the electronic flash is radiated. In a third step, pixel signals of one field are outputted by performing, after the second exposure and without discharging electric charges accumulated on the imaging device, a third exposure in which the imaging device is exposed and during which the electronic flash is not radiated. In the fourth step, the pixel signals outputted by the first step are subtracted from the pixel signals outputted by the third step, to generate pixel signals corresponding to one field.

BRIEF DESCRIPTION OF THE DRAWINGS

The present invention will be better understood from the description of the preferred embodiments of the invention set forth below, together with the accompanying drawings, in which.

DESCRIPTION OF THE PREFERRED EMBODIMENTS

Figure 1:
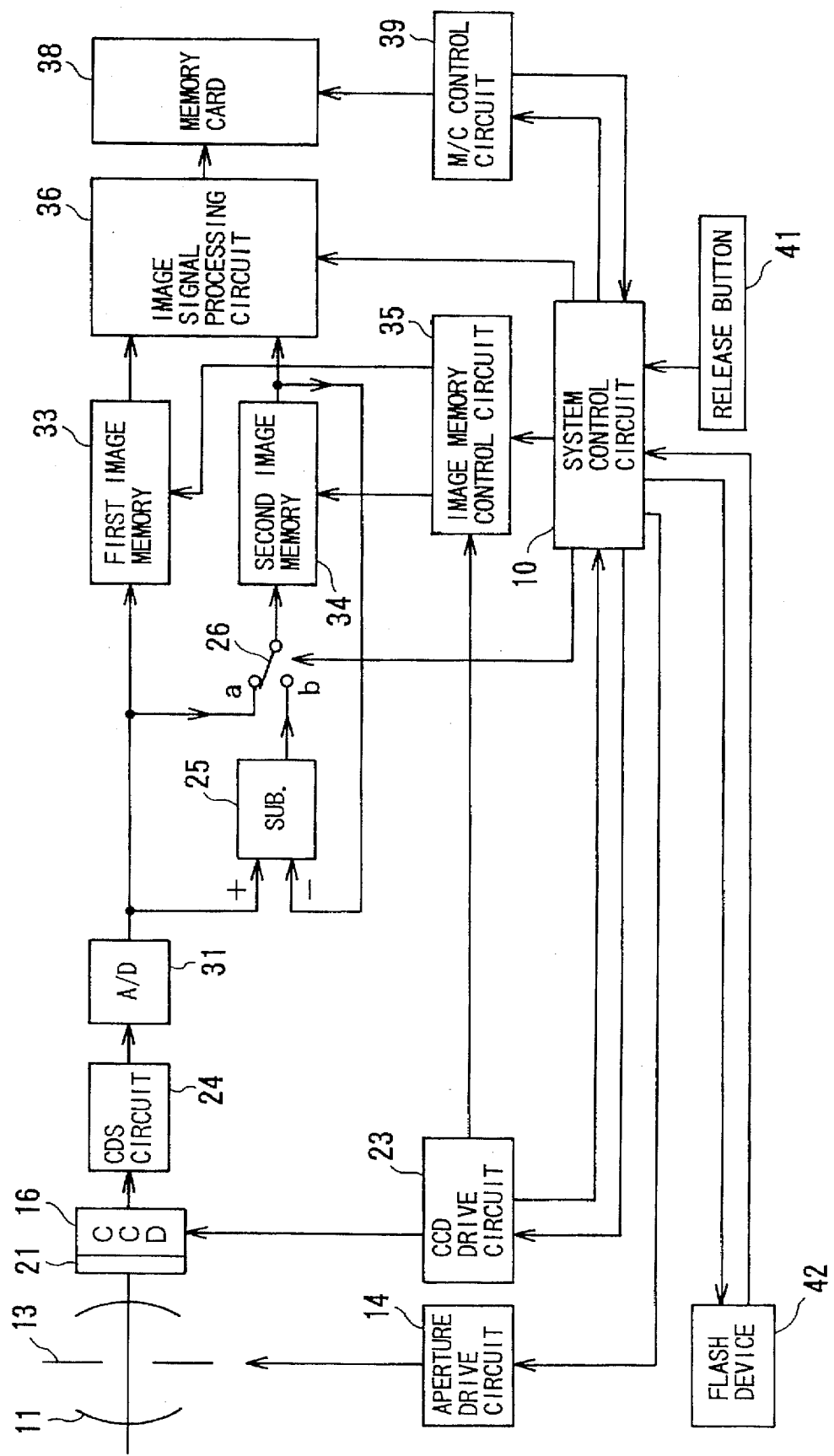
FIG. 1 is a block diagram showing a still-video camera in which a pixel signal generating device according to a first embodiment of the present invention is provided.

The present invention will now be described with reference to embodiments shown in the drawings. FIG. 1 is a block diagram showing a still-video camera in which a pixel signal generating device according to a first embodiment of the present invention is provided.

The still-video camera is controlled, as a whole, by a system control circuit 10 which includes a micro-computer.

A focus lens 11 is controlled by a focus lens drive circuit (not shown) to focus the image. An aperture 13 is controlled by an aperture drive circuit 14, to control the exposure, so that the opening of the aperture 13 may be adjusted. The focus lens drive circuit and the aperture drive circuit 14 are controlled by the system control circuit 10.

Light passing through the focus lens 11 and the aperture 13 is incident on a CCD (imaging device) 16. The CCD 16 is a solid state imaging device, and has photodiodes which correspond to pixels aligned in a horizontal direction and in a vertical direction of a reproduced image plane, so that pixel signals corresponding to the object are generated in the photodiodes. A color filter 21 is provided on a light receiving surface of the CCD 16. The color filter 21 has color filter elements positioned on the photodiodes of the CCD 16.

The CCD 16 is controlled by a CCD drive circuit 23 through the system control circuit 10, so that pixel signals corresponding to the image formed on the CCD 16 are supplied to correlation-double-sampling (CDS) circuit 24.

The pixel signals inputted to the CDS circuit 24 are subjected to a predetermined process, such as removing of a reset noise, and then are converted to digital signals by A-D converter 31. The digital pixel signals are stored in a first or a second image memory 33 or 34. Each memory 33 and 34 has a storage capacity large enough to store one field's worth of pixel signals. Addresses in the image memories 33 and 34 at which the image signals are stored are controlled by an image memory control circuit 35, which is operated in accordance with a command signal outputted from the CCD drive circuit 23 and the system control circuit 10.

A subtractor 25 and a switch 26 are provided between the A-D converter 31 and the image memory 34. The switch 26 is controlled by the system control circuit 10. The switch 26 usually connects the A-D converter 31 to the second image memory 34, and may temporarily connect the subtractor 25 to the second image memory 34 when the photographing operation is performed with an electronic flash, as described later. One input terminal of the subtractor 25 is connected to the A-D converter 31, and another input terminal of the subtractor 25 is connected to an output terminal of the second image memory 34, so that the subtractor 25 outputs a difference between a pixel signal outputted from the A-D converter 31 and a pixel signal outputted from the second image memory 34.

The pixel signals read-out from the image memories 33 and 34 are inputted into an image signal processing circuit 36, and are subjected to a predetermined process to be converted into red(R)-, green(G)- and blue(B)-signals. These R-, G- and B-signals are inputted into an interface circuit (not shown), in which each of these signals is converted to a signal having a format suitable for recording on a memory card 38. The recording operation of the R-signal, the G-signal and the B-signal onto the memory card 38 is carried out by the system control circuit 10 through a memory card control circuit 39.

A release button 41 is connected to the system control circuit 10. As described later, when the release button 41 is partly depressed, photometry measurement and distance measurement are performed. When the release button 41 is fully depressed, a recording operation of the image signal onto the memory card 38 is carried out. Also an electronic flash device 42 is connected to the system control circuit 10.

Figure 2A:
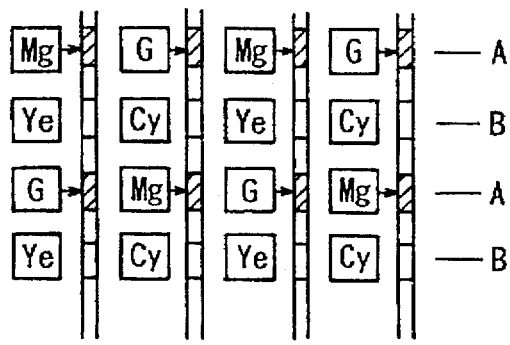
FIGS. 2A and 2B are diagrams showing arrangements of a color filter disposed on light receiving surfaces of a CCD.
Figure 2B:
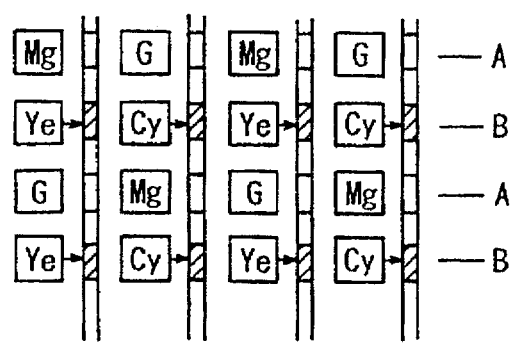

FIG. 2A and 2B show arrangements of the color filter 21 disposed on the photodiodes, which are provided on the light receiving surface of the CCD 16 in a matrix arrangement of rows. The color filter 16 is a complementary color filter with a checkerboard (or matrix) arrangement. In the color filter 16, filter elements for passing magenta (Mg) light, yellow (Ye) light, cyan (Cy) light and green (G) light are arranged alternately in a regular manner. Namely, a magenta (Mg) filter element and a green (G) filter element are arranged alternately on horizontal rows indicated by reference "A", and a yellow (Ye) filter element and a cyan (Cy) filter element are arranged alternately on adjacent horizontal rows indicated by reference "B".

Pixel signals generated in the CCD 16 are read-out from the CCD 16 according to the interline transfer system. In the example shown in FIG. 2A and 2B, when reading the first field, pixel signals of alternating rows "A" are outputted from the CCD 16, and when reading the second field, pixel signals of alternating rows "B", each "B" is positioned between two "A" rows, and are outputted from the CCD 16. Note, that the "A" and "B" rows correspond to horizontal scan lines which appear when the image obtained by the CCD 16 is displayed in a display device (not shown).

Figure 3A:
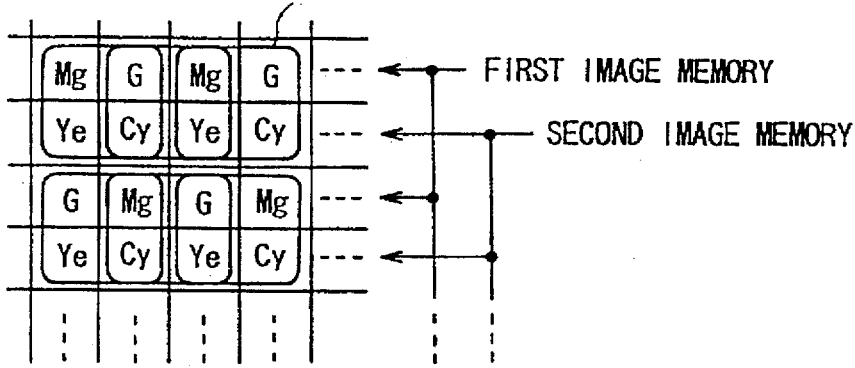
FIGS. 3A and 3B are diagrams showing an arrangement of pixels on an image memory, and a combination of the pixel signals for generating a color signal.
Figure 3B:
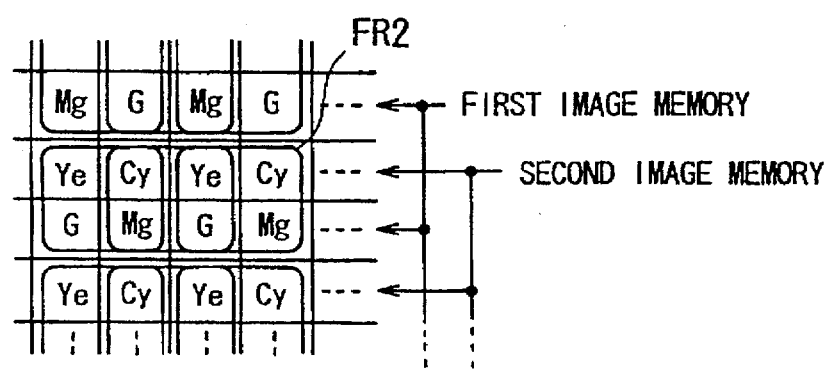

Pixel signals read-out for the first field are stored in the first image memory 33, and pixel signals read-out for the second field are stored in the second image memory 34, for example. Namely, all the pixel signals generated in the CCD 16 are stored in the image memories 33 and 34. These signals are converted to an R-signal, a G-signal and a B-signal by the image signal processing circuit 36, in which, as shown in FIG. 3A and 3B, the pixel signals enclosed by the frame FR1 are used to obtain the R-, G- and B-signals of a first field, and the pixel signals enclosed by the frame FR2 are used to obtain the R-, G- and B-signals of a second field. Namely, the frames FR1 and FR2 are offset to each other by one row of pixel signals, and the first and second field image signals are obtained by using the same pixel signals.

Figure 4:
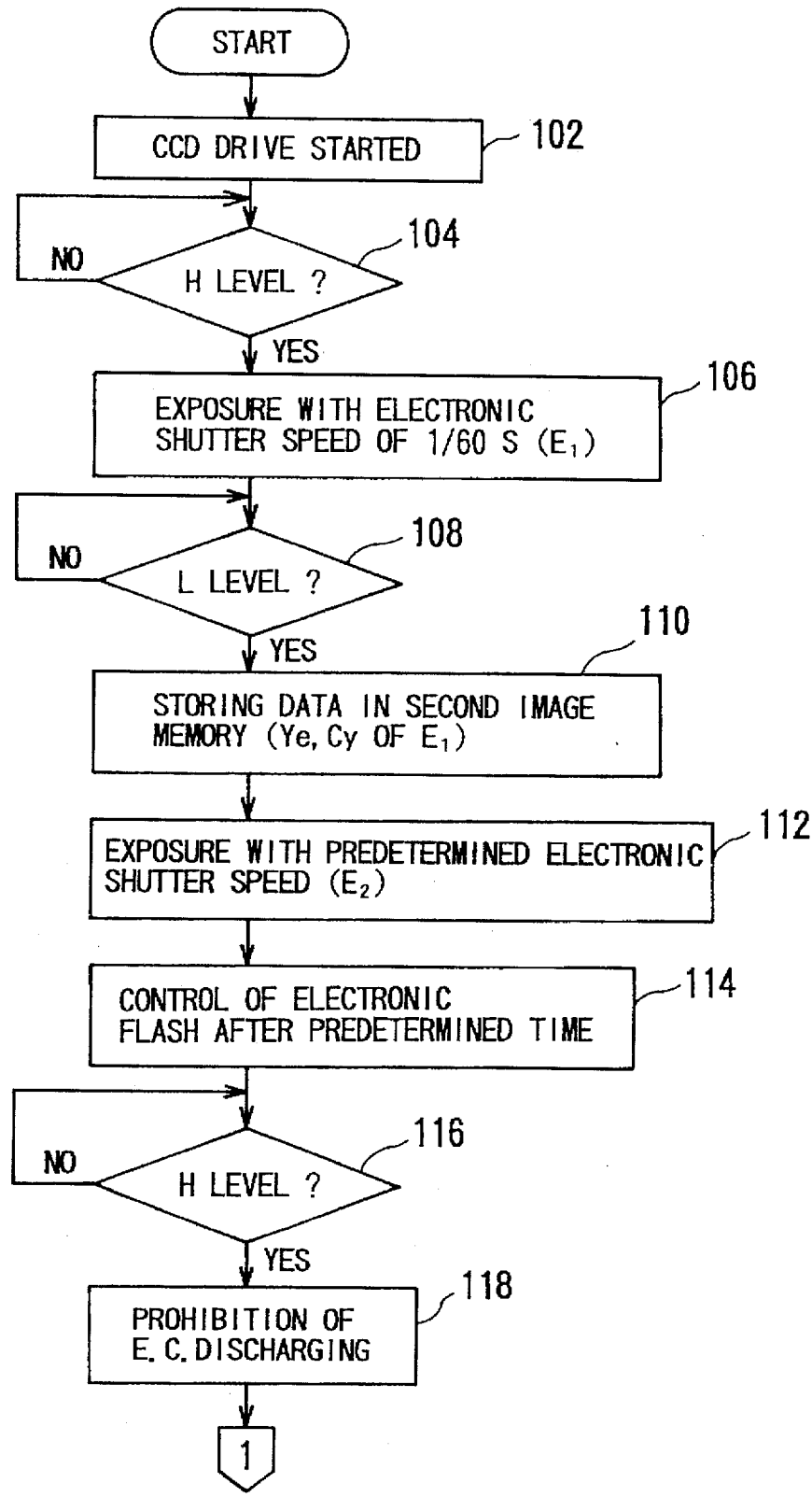
FIG. 4 is a first part of a flow chart of a program by which a photographing operation is performed with radiating an electronic flash, according to the first embodiment.
Figure 5:
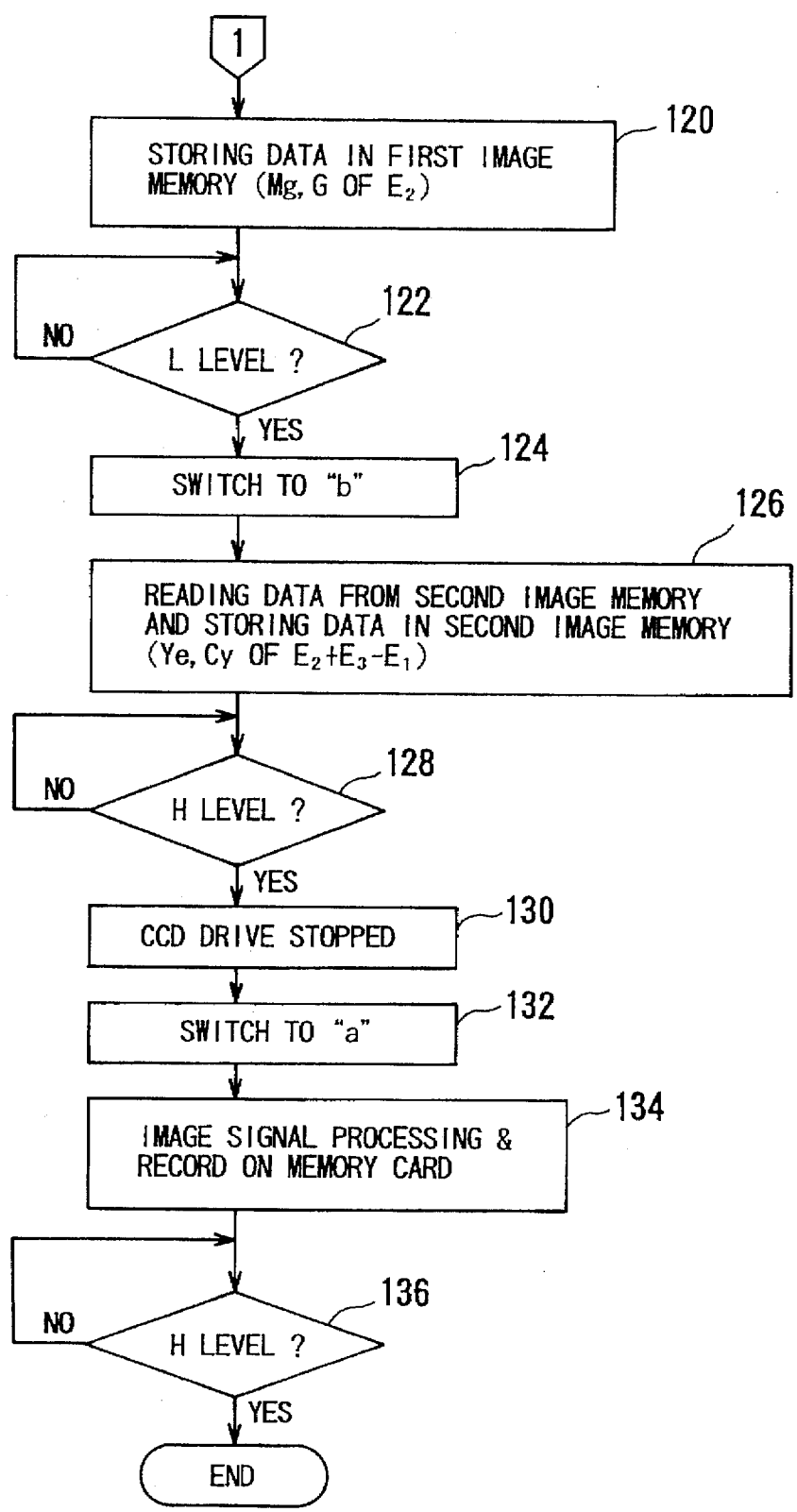
FIG. 5 is a second part of the flow chart of the program shown in FIG. 4.
Figure 6:
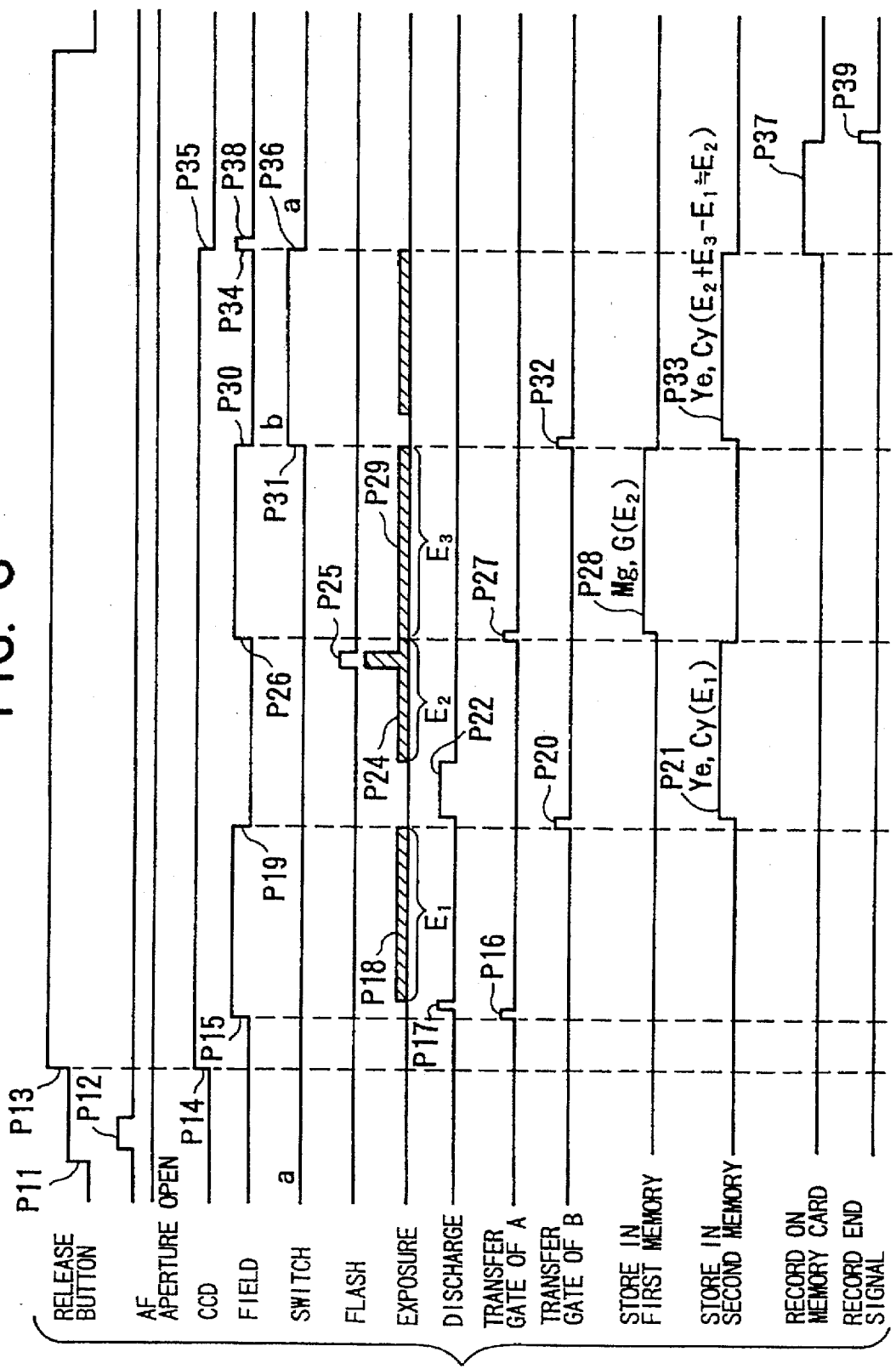
FIG. 6 is a timing chart showing the photographing operation performed with radiating an electronic flash, according to the first embodiment.

With reference to FIGS. 4 through 6, a photographing operation with the electronic flash is described below. Note, that this photographing operation is performed while the aperture is open.

FIGS. 4 and 5 show a flow chart of a program by which, after pixel signals obtained by exposure of the CCD 16 are stored in the image memories 33 and 34, the pixel signals are read-out from the image memories 33 and 34 and subjected to a predetermined process to be recorded in a memory card. This program is executed by the system control circuit 10. FIG. 6 shows a timing chart of the photographing operation.

Upon partially depressing the release button 41 (reference P11), a distance measurement is performed, so that the focus lens 11 is moved to the in-focus position (reference P12). At the same time, photometry is carried out by a photometry circuit (not shown) and an exposure calculation is carried out, and thus, an electronic shutter speed is determined. Then, upon fully depressing the release button 41 (reference P13), the program, the flow chart of which is shown in FIGS. 4 and 5, is started, and the CCD 16 is started to be driven in Step 102 (reference P14).

In Step 104, it is determined whether a field signal has changed a high (H) level. The field signal is outputted from the CCD drive circuit 23; at an H level in the first field, and at a low (L) level in the second field. When the field signal changes to the H level (reference P15), the process proceeds from Step 104 to Step 106, in which a command signal is outputted so that an exposure is carried out with a 1/60 second (corresponding to one field) electronic shutter speed (an electric charge accumulating operation of 1/60 second), and a transfer gate signal for the "A" rows is outputted by the CCD drive circuit 23 (reference P16). Although, by the transfer gate signal, pixel signals of each "A" row accumulated on the photodiodes of the CCD 16 are transferred to vertical transfer CCDs and read-out from the CCD, these pixel signals are useless. Therefore, in Step 106, these pixel signals are not stored, but discharged.

Then, an electric charge discharging signal is outputted (reference P17). This electric charge discharging signal falls at a timing which is in accordance with the electronic shutter speed, whereby a first exposure E1 in which the CCD 16 is exposed is started (reference P18). The electronic flash does not radiate during this exposure E1.

In Step 108, it is determined whether the field signal has changed to the L level. When the field signal has changed to the L level (reference P19), in Step 110, a command by which pixel signals are stored in the second image memory 34, i.e., a transfer gate signal for the "B" rows is outputted (reference P20). As a result, Ye- and Cy-signals obtained by the first exposure E1 are transferred from the photodiodes to the vertical transfer CCDs, and are outputted from the CCD 16 to be stored in the second image memory 34 (reference P21). Note that, by this output of the transfer gate signal, the exposure E1 of the CCD 16 is completed.

At the same time that the storing operation to the second image memory 34 is started, in Step 112, a command signal is outputted so that a second exposure E2 is carried out with an electronic shutter speed which is determined so that the proper exposure is obtained taking into account the amount of flash light to be radiated, and the electric charge discharging signal is outputted (reference P22). Namely, all the electric charges accumulated on the CCD 16 are discharged to the substrate of the CCD 16. This electric charge discharging signal falls at a timing according to the electronic shutter speed, and an exposure of the CCD 16 is started (reference P24). In Step 114, after a predetermined period has passed from the commencement of the second exposure E2, a command for control of the electronic flash is outputted (reference P25).

Then, when it is determined in Step 116 that the field signal has changed to the H level (reference P26), electric charge discharging is prohibited in Step 118, and a command by which pixel signals are stored in the first image memory 33, i.e., a transfer gate signal for the "A" rows is outputted (reference P27). As a result, Mg- and G-signals obtained by the second exposure E2 are transferred from the photodiodes to the vertical transfer CCDs, and are outputted from the CCD 16 to be stored in the first image memory 33 (reference P28).

While this storing operation is carried out, a third exposure E3 is carried out in the CCD 16 subsequent to the second exposure E2. This third exposure E3 lasts for the same period of time as the first exposure E1 (reference P29), and is carried out after the radiation of the electric shutter is completed. Thus, the pixel signals are outputted from the CCD 16 for three sequential fields.

When it is determined in Step 122 that the field signal has changed to the L level (reference P30), the switch 26 is switched from the position "a" corresponding to the A-D converter 31 to the position "b" corresponding to the subtractor 25 in Step 124 (reference P31). Then, in Step 126, a command by which pixel signals are read-out from and stored in the second image memory 34, i.e., a transfer gate signal for "B" rows is outputted (reference P32). Since the electric charge discharging was prohibited in Step 118, the pixel signals read in accordance with the transfer gate signal for the "B" rows correspond to a time from the completion of the electric charge discharge operation (reference P22) to the output of the transfer gate signal for the "B" rows (reference P32); i.e. the electric charge accumulation period equals the sum of the second and third exposure periods E2 and E3. Further, Ye- and Cy-signals obtained by the second and third exposures E2 and E3 are read-out from the CCD 16, and inputted into the subtractor 25, and at the same time, Ye- and Cy-signals obtained by the first exposure E1 are read-out from the second image memory 34 and inputted into the subtractor 25. Accordingly, signals obtained by subtracting the Ye- and Cy-signals corresponding to the first exposure E1 from the Ye- and Cy-signals corresponding to the second and third exposures E2 and E3 are outputted from the subtractor 25.

The output signals of the subtractor 25 are stored in the second image memory 34 (reference P33), so that the contents of the memory 34 is changed from the data of the first exposure E1 to the data corresponding to the difference between the exposures E2 and E3 and the exposure E1. The values of the pixel signals of the exposures E1 and E3 are approximately equal to each other when the same object is photographed. Therefore, the values of the pixel signals stored in the second image memory 34 in Step 126 correspond to the second exposure E2, and are equivalent to a state in which an electronic flash is radiated. The Ye- and Cy-signals obtained while radiating the electronic flash are stored in the second image memory 34.

In Step 128, it is determined whether the field signal has changed to the H level. When the change to the H level is detected (reference P34), the drive of the CCD 16 is stopped in Step 130 (reference P35), and the switch 26 is switched to the A/D converter 31 in Step 132 (reference P36). Then, in Step 134, the pixel signals stored in the first and second image memories 33 and 34 are transmitted to the image signal processing circuit 36 to be subjected to a predetermined process, and are recorded in the memory card 38 (reference P37). During this recording operation, the field signal changes from the H level to the L level (reference P38). When it is determined in Step 136 that a record end signal has been changed to an H level (reference P39), it is determined that the recording operation of the memory card 38 has been completed, and then the program ends.

Figure 7:
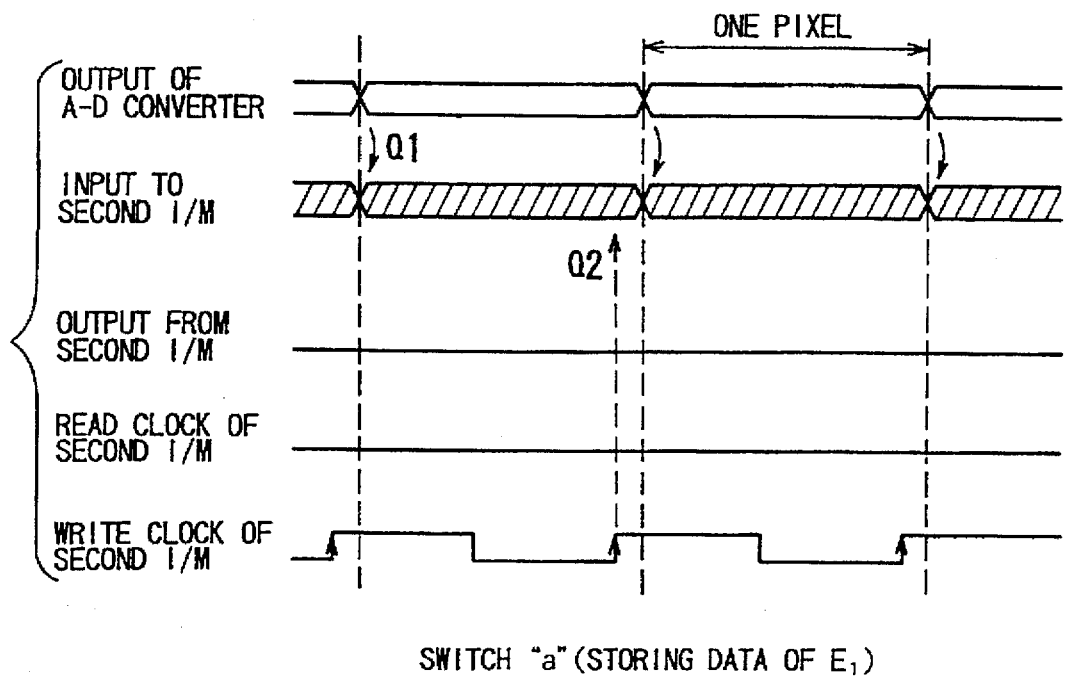
FIG. 7 is a diagram showing an operation in which pixel signals are stored in a second image memory when a switch is switched to an A-D converter.

FIG. 7 shows an operation in which pixel signals are stored in the second image memory 34 when the switch 26 is set to the A-D converter 31 (position "a"). As shown in this drawing, when the output of the A-D converter 31 is changed, the input of the second image memory 34 is also changed in synchronization therewith (reference Q1). A write clock signal of the second image memory 34 rises with the same period as the output of the A-D converter 31, and a writing operation of the second image memory 34 is performed with the timing in synchronization with the rising of the write clock signal. On the other hand, in this state, since a read clock signal of the second image memory 34 is at the L level, the output from the memory 34 is zero. Note, that the read clock and the write clock signals are outputted from the system control circuit 10. A writing operation of the first image memory 33 is performed using the same timing as that of the second image memory 34.

Figure 8:
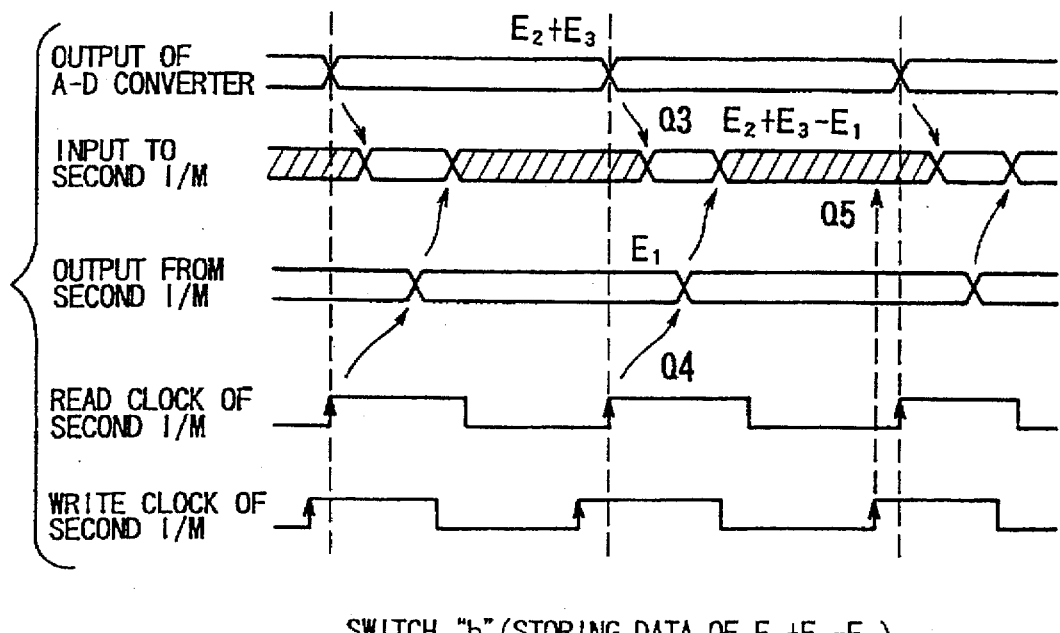
FIG. 8 is a diagram showing an operation in which pixel signals are stored in, and read from, the second image memory when the switch is switched to a subtractor.

FIG. 8 shows an operation in which pixel signals are stored in, and read from, the second image memory 34 when the switch 26 is set to the subtractor 25 (position "b"). As shown in this drawing, when the output (E2+E3) of the A-D converter 31 is changed, the input of the second image memory 34 is also changed in synchronization therewith (reference Q3). A read clock signal of the second image memory 34 rises with the same period as the output of the A-D converter 31, and pixel signals (E1) are outputted from the second image memory 34 with the timing (reference Q4) in synchronization with the rising of the read clock signal. The pixel signals are inputted into the subtractor 25.

Since the pixel signals (E2+E3) outputted from the A-D converter 31 are inputted into the subtractor 25, the pixel signals (E2+E3−E1) are outputted from the subtractor 25. The pixel signals (E2+E3−E1) are inputted into the second image memory 34, and stored therein with the timing (reference Q5) in synchronization with the rising of the write clock.

Figure 9:
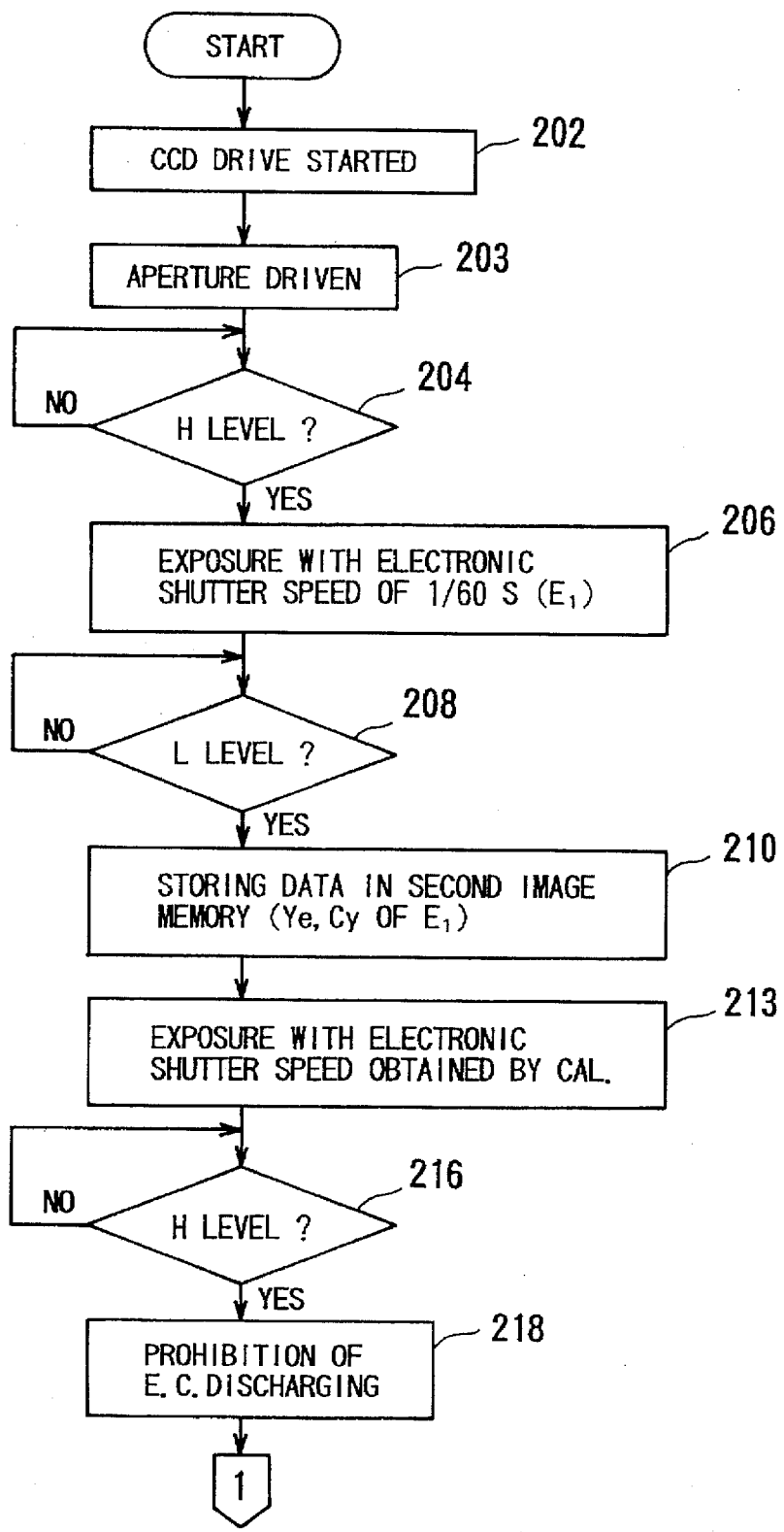
FIG. 9 is a first part of a flow chart of a program for a normal photographing operation.
Figure 10:
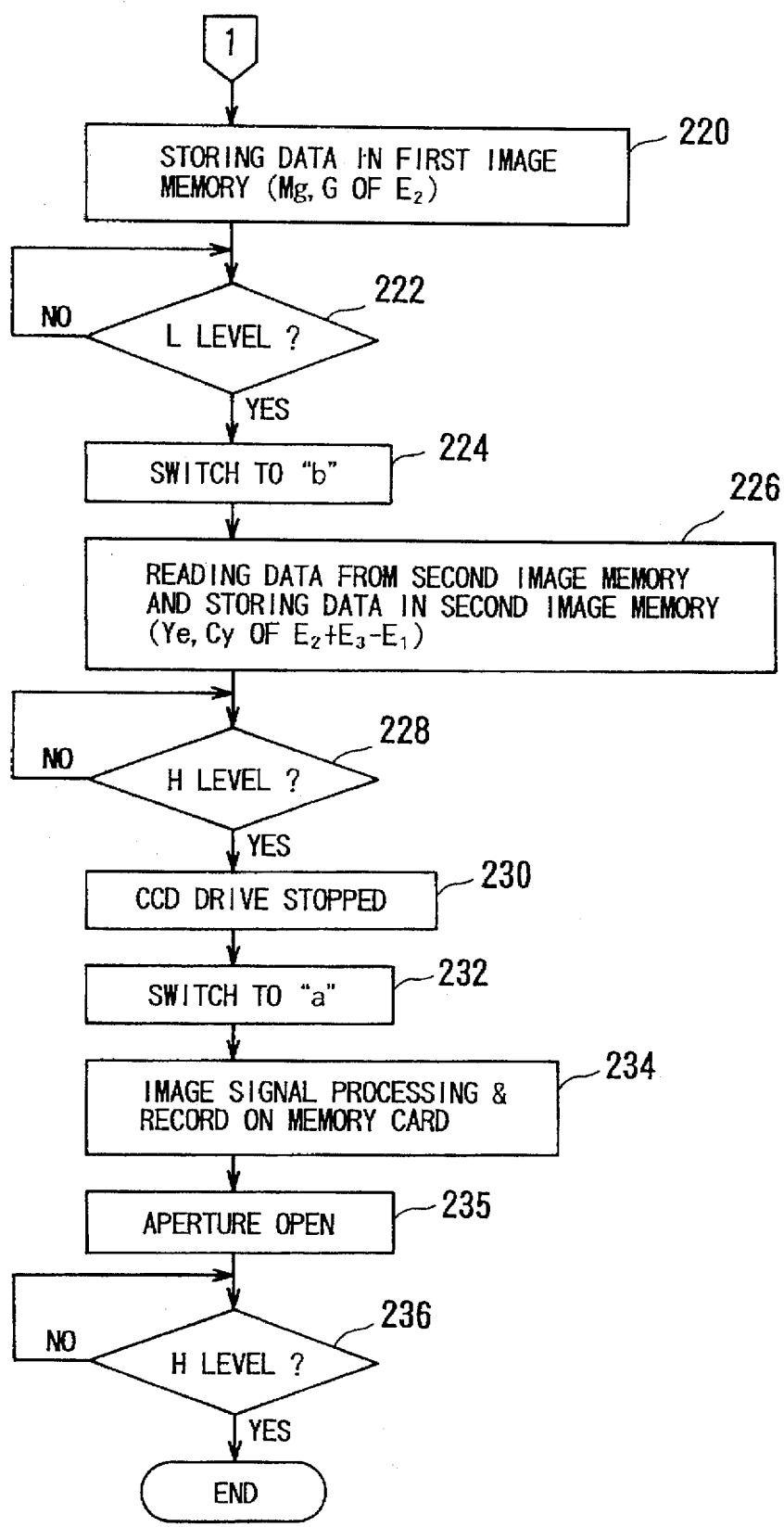
FIG. 10 is a second part of the flow chart of the program shown in FIG. 9.
Figure 11:
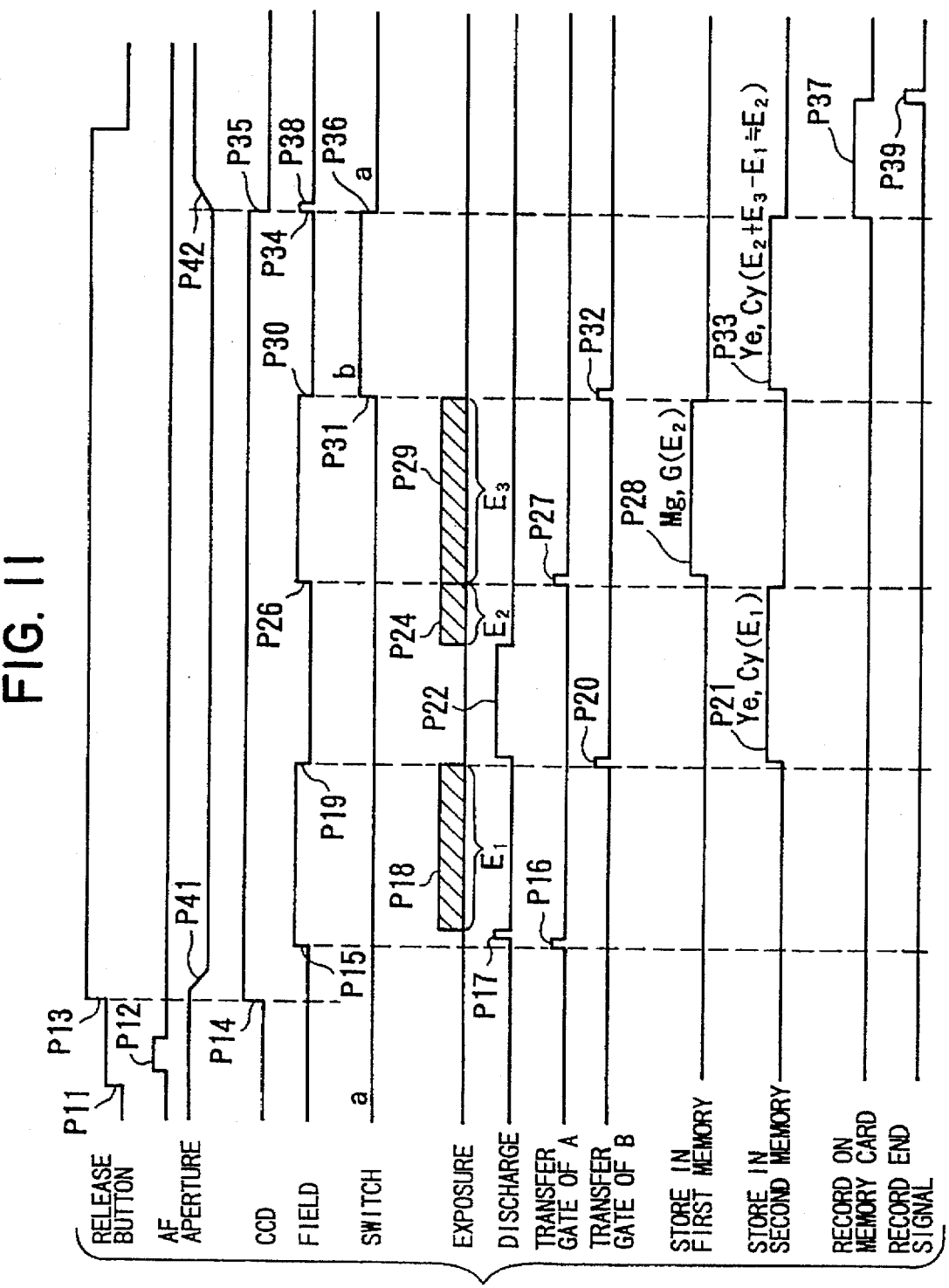
FIG. 11 is a timing chart showing a normal photographing operation.

FIGS. 9 through 11 illustrate a normal photographing operation of this embodiment, i.e., a photographing operation in which the electronic flash is not radiated.

FIGS. 9 and 10 show a program by which the normal photographing operation is performed. This program is executed in the system control circuit 10. FIG. 11 is a timing chart of the normal photographing operation.

Note, that the same timing references are used in FIG. 11 as in FIG. 6, and that the legend numerals found in FIGS. 9 and 10 correspond to those of FIGS. 4 and 5, except they are increased by "100". The description of corresponding elements will be omitted here to avoid repetition.

After a starting operation of the CCD 16 in Step 202, the aperture 13 is driven in Step 203, so that the opening degree of the aperture 13 is set to a value based on a photometry result (reference P41). By the execution of Step 210, Ye- and Cy-signals obtained by the first exposure E1 are stored in the second image memory 34 (reference P21). At the same time when this storing operation is started, in Step 213, a command signal is outputted so that an exposure according to the electronic shutter speed obtained by the exposure calculation is performed, and thus, an electric charge discharging signal is outputted in accordance with the command signal (reference P22). This electric charge discharging signal falls at a timing which is in accordance with the electronic shutter speed, whereby a second exposure E2 is started (reference P24).

After Mg- and G-signals obtained by the second exposure E2 are stored in the first image memory 33 (reference P28), the switch 26 is switched to the subtractor 25 in Step 224 (reference P31). Then, by the execution of Step 226, Ye- and Cy-signals obtained by the second and third exposures E2 and E3 are read out from the CCD 16, and inputted into the subtractor 25, so that the Ye- and Cy-signals obtained by the first exposure E1 are subtracted from the Ye- and Cy-signals of the second and third exposures E2 and E3, and the output signal of the subtractor 25 is stored in the second image memory 34 (reference P33).

In Step 234, a recording operation is performed, recording the pixel signals into the memory card 38. In Step 235, the aperture 13 is driven to the fully open state (reference P42).

The other steps are the same as those in the photographing operation done with radiation of the electronic flash.

As described above, according to the first embodiment, when pixel signals generated by the CCD 16 are read-out from two time-divided fields according to the interline transfer system, only one radiation of the electronic flash is needed. Therefore, in comparison with a construction in which the electronic flash radiation is performed once in each field, the electric power consumption is reduced by one-half, so that the life of the battery, which is a power source, is prolonged. Thus, the number of recordable frames possible using one battery is increased. Further, since battery capacity is preserved, the amount of light radiated per one photograph need not be reduced. Therefore, the problem where the distance to which the flash beam reaches is shortened does not occur. Still further, in the embodiment, since it is not necessary to shield the CCD 16 from light after a photographing operation with an electronic flash, the construction of the imaging device is simplified and it can be miniaturized, reducing the manufacturing cost.

Further, according to the embodiment, in the normal photographing operation in which an electronic flash is not radiated, reading of pixel signals from the CCD 16 and storing pixels signals to the memories 33 and 34 are basically the same as those of the photographing operation in which an electronic flash is radiated. Therefore, the system control circuit 10 is simplified.

Note that, although E1=E3=⅙₀ second is set using the periodicity of the transfer gate signal to simplify the circuit in the first embodiment, E1 and E3 can be selected freely, as long as the first and third exposures are carried out for the same length of time.

Figure 12:
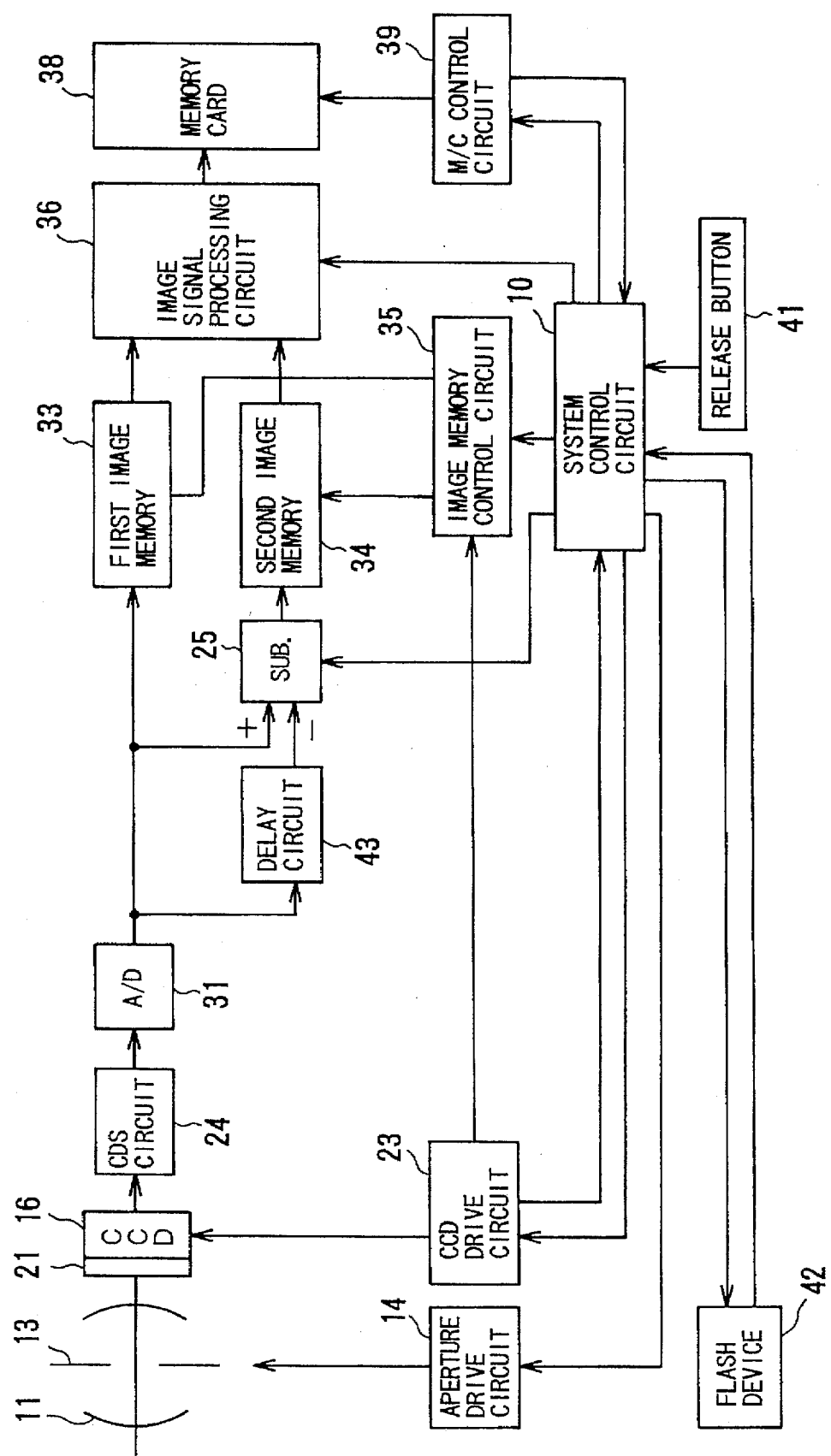
FIG. 12 is block diagram showing a still-video camera in which a pixel signal generating device according to a second embodiment is provided.

FIG. 12 is block diagram of a still video camera having a luminance signal generating device according to a second embodiment.

The second embodiment differs in construction from the first embodiment in that a two-field delay circuit 43 is provided between the A-D converter 31 and the subtractor 25, and the switch is not provided between the subtractor 25 and the second image memory 34. The delay circuit 43 has a storage capacity of two fields of pixel signals, and outputs pixel signals inputted from the A-D converter 31 to the subtractor 25 with a delay corresponding to two fields. The other components are the same as those of the first embodiment.

Figure 13:
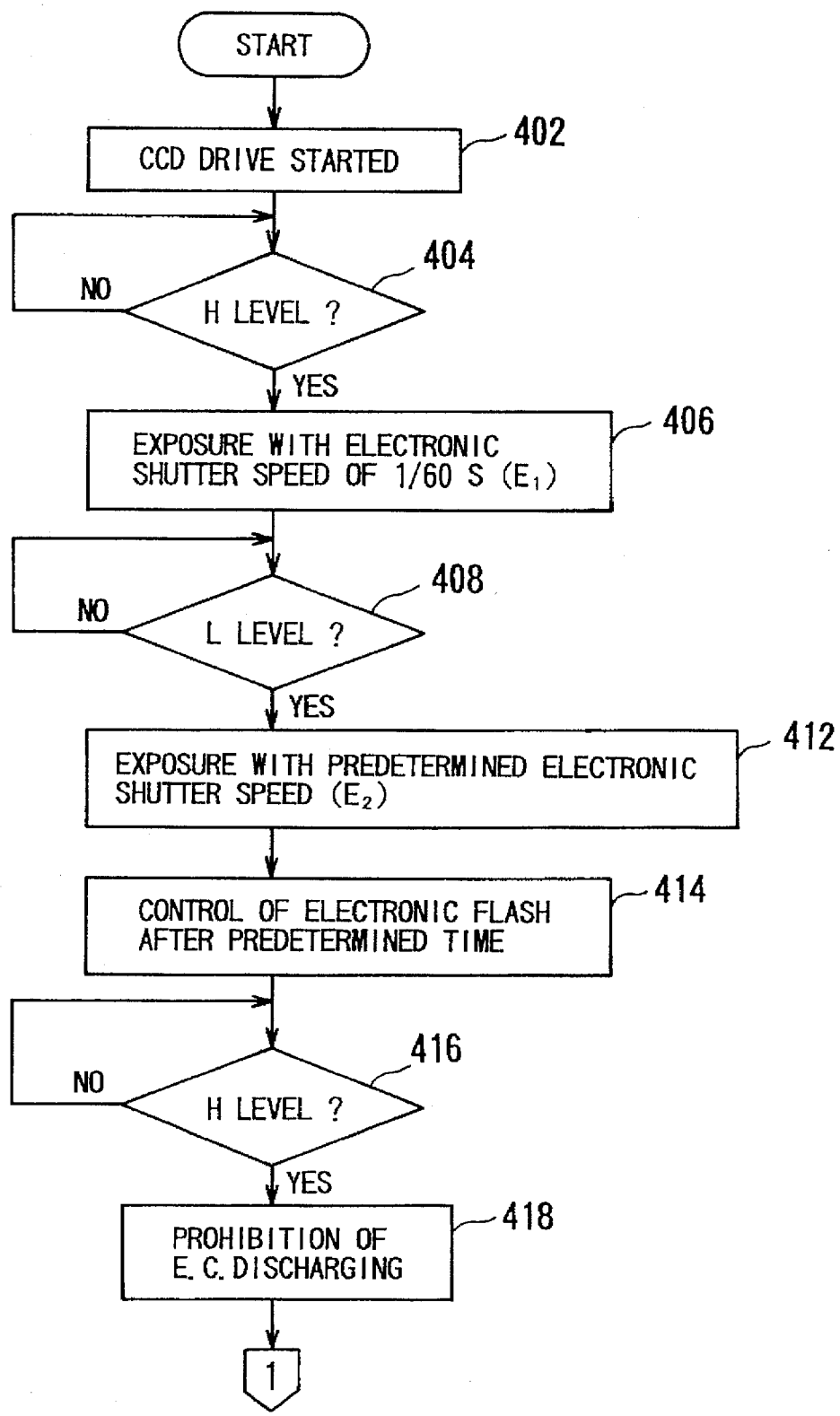
FIG. 13 is a first part of a flow chart of a program by which a photographing operation is performed with radiating an electronic flash, according to in the second embodiment.
Figure 14:
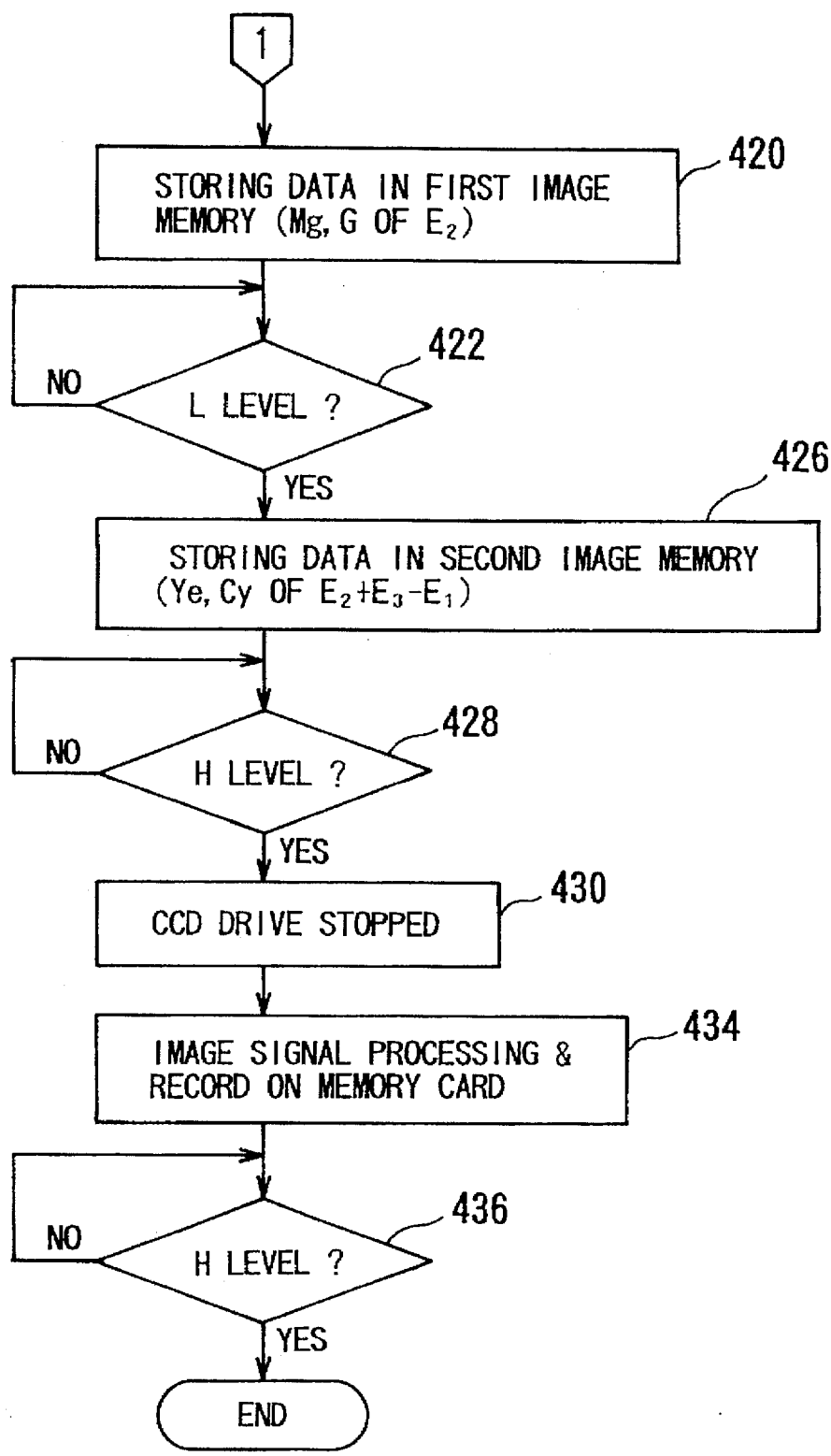
FIG. 14 is a second part of the flow chart of the program shown in FIG. 13.
Figure 15:
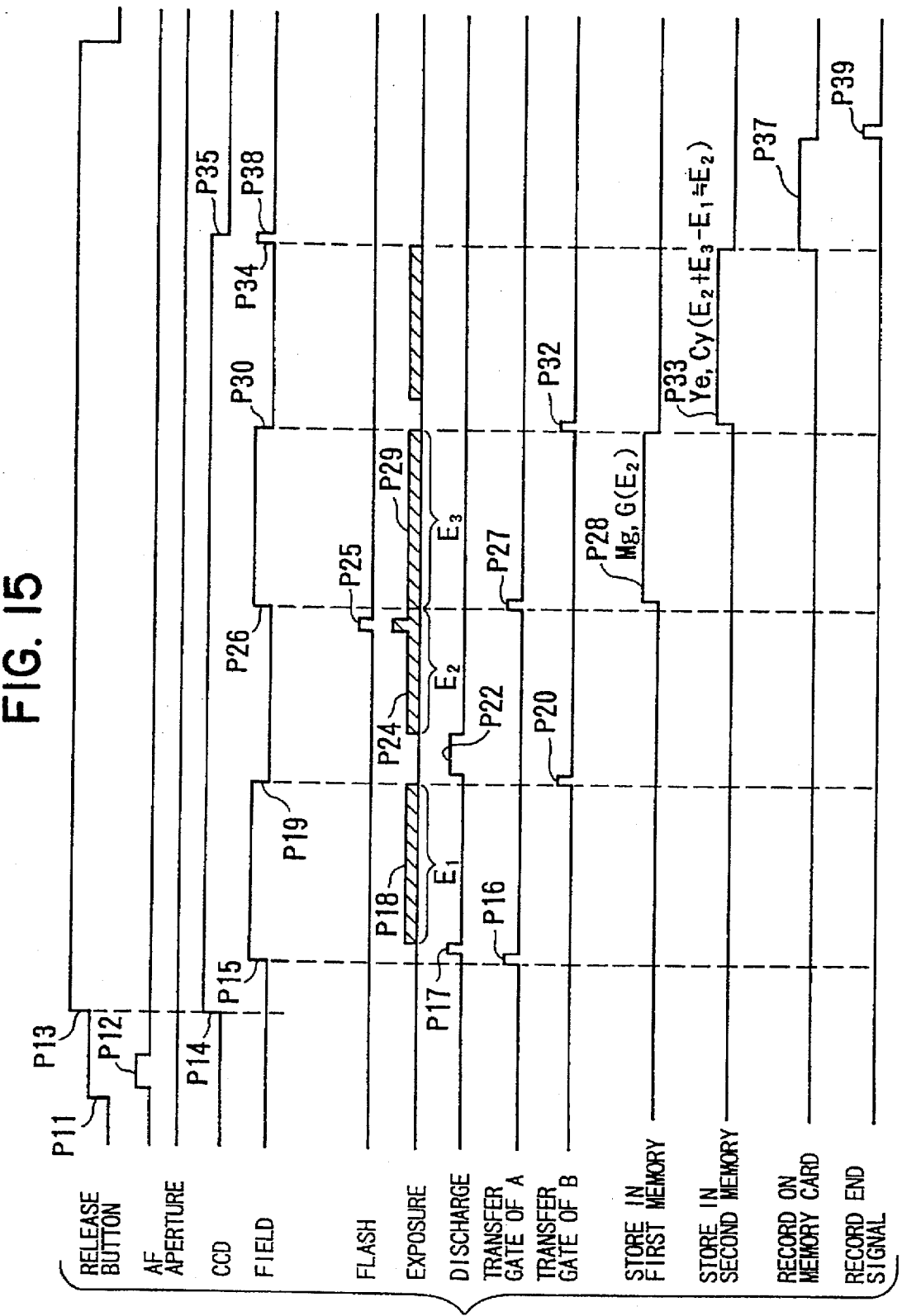
FIG. 15 is a timing chart showing the photographing operation according to the second embodiment.

FIGS. 13 through 15 show a photographing operation in which an electronic flash is radiated, according to the second embodiment.

FIGS. 13 and 14 are flow charts of a program for carrying out the photographing operation. FIG. 15 is a timing chart of the photographing operation. Note, that the same timing references are used in FIG. 15 as in FIG. 11, and that the legend numerals found in FIGS. 13 and 14 correspond to those of FIGS. 4 and 5, except they are increased by "300". The description of corresponding elements will be omitted here to avoid repetition.

By the execution of Step 406, the first exposure E1 is performed (reference P18), and Ye- and Cy-signals obtained by this exposure E1 are stored, in the delay circuit 43 for two fields, and then outputted from the delay circuit 43.

After starting the first exposure E1, when it is determined in Step 408 that the field signal has changed to the L level (reference P19), in Step 412, a command signal is outputted so that an exposure according to a predetermined electronic shutter speed, which is determined so that the proper exposure is obtained taking into account the amount of light to be radiated (reference P19). In accordance with this command signal, an electric charge discharging signal is outputted (reference P22). This electric charge discharging signal falls at a timing which is in accordance with the electronic shutter speed, whereby a second exposure E2 is started (reference P24). In Step 414, control command for radiation of the electronic flash is issued after a predetermined time has passed from the exposure E2 (reference P25). Then, after the execution of Step 420, Mg- and G-signals obtained by the second exposure E2 are stored in the first image memory 33 (reference P28).

Then, when it is determined in Step 422 that the field signal has changed to the L level (reference P30), a command for writing data in the second image memory 34 is outputted in Step 426 (reference P32). Thus, Ye- and Cy-signals obtained by the second and third exposures E2 and E3 are read-out from the CCD 16, and inputted into the subtractor 25. At this time, the Ye- and Cy-signals which have been outputted from the delay circuit 43 two fields ago, i.e., which were obtained during the first exposures E1, are inputted into the subtractor 25. Therefore, the signals outputted from the subtractor 25 are obtained by subtracting the Ye- and Cy-signals of the first exposure E1 from the Ye- and Cy-signals of the second and third exposures E2 and E3, and the output signals are inputted in the second image memory 34 (reference P33). During the three successive exposures E1, E2 and E3, pixel signals of three sequential fields are output. The other operations are the same as those of the first embodiment.

As described above, according to the second embodiment, since the switch 26 is not needed, the device is easier to control than in the first embodiment.

Note that, although each of the above embodiments is provided with a single CCD, the present invention can be applied to a still video camera in which a plurality of CCDs are provided.

Further note that the color filter 21 is not restricted to the complementary color filter with a matrix arrangement, but can be an imaging device employing a color filter having red, green and blue filter elements.

Although the embodiments of the present invention have been described herein with reference to the accompanying drawings, obviously many modifications and changes may be made by those skilled in this apt without departing from the scope of the invention.

The present disclosure relates to subject matter contained in Japanese Patent Applications No. 6-102244 (filed on Apr. 15, 1994) which is expressly incorporated herein, by reference, in its entirety.

I claim:

1. A device for generating pixel signals corresponding to two fields based on exposures in which electric charges are accumulated on an imaging device, said pixel signal generating device comprising:

a first pixel signal outputting processor that outputs pixel signals corresponding to one field by performing a first exposure in which said imaging device is exposed and during which an electronic flash is not radiated;

a second pixel signal outputting processor that outputs pixel signals corresponding to one field by performing, after said first exposure and after discharging electric charges accumulated on said imaging device, a second exposure in which said imaging device is exposed and during which said electronic flash is radiated;

a third pixel signal outputting processor that outputs pixel signals corresponding to one field by performing, after said second exposure and without discharging electric charges accumulated on said imaging device after said second exposure, a third exposure in which said imaging device is exposed and during which said electronic flash is not radiated, so that said pixel signal output by said third pixel signal outputting processor corresponds to said third exposure combined with said second exposure; and a subtracting processor that subtracts said pixel signals outputted by said first pixel signal outputting processor from said pixel signals outputted by said third pixel signal outputting processor, to generate pixel signals corresponding to one field, said pixel signals generated by said subtracting processor being substantially equivalent to pixel signals obtained during an exposure in which said electronic flash is radiated.

2. A device according to claim 1, wherein said subtracting processor has a subtractor that subtracts said pixel signals outputted by said first pixel signal outputting processor from said pixel signals outputted by said third pixel signal outputting processor.

3. A device according to claim 1, wherein said subtracting processor has a memory that stores pixel signals outputted from said first pixel signal outputting processor.

4. A device according to claim 1, wherein said second pixel signal outputting processor has a memory that stores pixel signals.

5. A device according to claim 1, wherein said subtracting processor has a delay circuit which delays pixel signals generated by said first pixel signal outputting processor by two fields, and said subtracting processor further outputs said pixel signals delayed by said delay circuit.

6. A device according to claim 1, wherein said first and third exposures are carried out for a same period of time.

7. A device according to claim 1, wherein one image is formed using pixel signals of a first field and pixel signals of a second field, said first and third pixel signal outputting processor outputting pixel signals corresponding to a same field.

8. A device according to claim 1, wherein one image is formed using pixel signals of a first field and pixel signals of a second field, said second pixel outputting processor outputting pixel signals of a field which is different from pixel signals of a field outputted by said first and third pixel signal outputting processor.

9. A device according to claim 1, wherein one image is formed by pixel signals of a first field and pixel signals of a second field, said second pixel outputting processor outputting pixel signals corresponding to one of said first field or said second field, and said subtracting processor generating pixel signals corresponding to one of said second field or first field.

10. A device according to claim 9, wherein said pixel signals are generated on photodiodes provided on said imaging device in a matrix arrangement having rows of said photodiodes, said pixels signals are read-out from said imaging device in alternating rows of said matrix arrangement to form said first and second fields.

11. A device according to claim 1, wherein said first, second and third pixel signal outputting processor outputs pixel signals of three sequential fields.

12. A device according to claim 1, wherein said imaging device has a color filter provided on a light receiving surface of said imaging device.

13. A device according to claim 12, wherein said color filter is a complementary color filter with a checkerboard arrangement.

14. A device for generating pixel signals corresponding to two fields based on exposures in which electric charges are accumulated on an imaging device, said pixel signal generating device comprising:

first pixel signal outputting means for outputting pixel signals corresponding to one field by performing a first exposure in which said imaging device is exposed and during which an electronic flash is not radiated;

means for discharging electric charges accumulated on said imaging device after said first exposure;

second pixel signal outputting means for outputting pixel signals corresponding to one field by performing, after said first exposure and after a discharging operation by said discharging means, a second exposure in which said imaging device is exposed and during which said electronic flash is radiated;

third pixel signal outputting means for outputting pixel signals corresponding to one field by performing, after said second exposure, a third exposure in which said imaging device is exposed and during which said electronic flash is not radiated, so that said pixel signal output by said third pixel signal outputting means corresponds to said third exposure combined with said second exposure; and means for subtracting said pixel signals outputted by said first pixel signal outputting means from said pixel signals outputted by said third pixel signal outputting means, to generate pixel signals corresponding to one field.

15. A method for generating pixel signals corresponding to two fields based on exposures in which electric charges are accumulated on an imaging device, said pixel signal generating method comprising:

outputting pixel signals corresponding to one field by performing a first exposure in which said imaging device is exposed and during which an electronic flash is not radiated;

outputting pixel signals corresponding to one field by performing, after said first exposure and after discharging electric charges accumulated on said imaging device, a second exposure in which said imaging device is exposed and during which said electronic flash is radiated;

outputting pixel signals corresponding to one field by performing, after said second exposure and without discharging electric charges accumulated on said imaging device after said second exposure, a third exposure in which said imaging device is exposed and during which said electronic flash is not radiated, and outputting, after said third exposure, pixel signals corresponding to said third exposure combined with said second exposure; and subtracting said pixel signals outputted corresponding to said first exposure from said pixel signals corresponding to said third exposure combined with said second exposure to generate pixel signals corresponding to one field.

16. A method for generating pixel signals corresponding to two fields based on exposures in which electric charges are accumulated on an imaging device, said method comprising:

outputting pixel signals corresponding to one field by performing a first exposure in which said imaging device is exposed and during which an electronic flash is not radiated;

discharging electric charges accumulated on said imaging device after said first exposure;

outputting pixel signals corresponding to one field by performing, after said discharging, a second exposure in which said imaging device is exposed and during which said electronic flash is radiated;

outputting pixel signals corresponding to one field by performing, after said second exposure, a third exposure in which said imaging device is exposed and during which said electronic flash is not radiated and outputting, after said third exposure, pixel signals corresponding to third exposure combined with said second exposure; and subtracting said pixel signals corresponding to said first exposure from said pixel signals corresponding to said third exposure combined with said second exposure to generate pixel signals corresponding to one field.

17. A pixel generating device provided in an electronic still video camera, said device comprising:

an imaging device for accumulating electric charges corresponding to an image of an object;

an electronic flash apparatus for radiating an electronic flash light to illuminate said object;

an electronic charge discharging apparatus for discharging electric charges accumulated on said imaging device;

a pixel signal reading apparatus for reading pixel signals in a first, a second and a third sequential stage, said pixel signals being derived from exposures in which electric charges are accumulated on said imaging device; and a pixel signal processing apparatus for processing said pixel signals after said pixel signals are read from said imaging device, wherein said pixel signal reading apparatus reads pixel signals in said first stage and while said electronic flash is not radiated, said pixel signal reading apparatus reading pixel signals in said second stage after said discharge apparatus discharges said electric charges accumulated on said imaging device and while said electronic flash is radiated, and said pixel signal reading apparatus reading pixel signals in said third stage without said discharge apparatus discharging said electric charges accumulated on said imaging device and while said electronic flash is not radiated, said reading in said third stage being performed so that said reading in said third stage is combined with said reading in said second stage, wherein said pixel signal processing apparatus processes pixel signals read during each of said stages to subtract pixel signals read during said first stage from pixel signals read during said third stage.

18. A device for generating pixel signals corresponding to two fields based on exposures in which electric charges are accumulated on an imaging device, said pixel signal generating device comprising:

a first pixel signal outputting processor that outputs pixel signals corresponding to one field by performing a first exposure in which said imaging device is exposed;

a second pixel signal outputting processor that outputs pixel signals corresponding to one field by performing, after said first exposure and after discharging electric charges accumulated on said imaging device, a second exposure in which said imaging device is exposed;

a third pixel signal outputting processor that outputs pixel signals corresponding to one field by performing, after said second exposure, a third exposure in which said imaging device is exposed, said third exposure being performed without discharging electric charges accumulated on said imaging device during said second exposure, so that said pixel signal output by said third pixel signal outputting processor corresponds to said third exposure combined with said second exposure; and a subtracting processor that subtracts said pixel signals outputted by said first pixel signal outputting processor from said pixel signals outputted by said third pixel signal outputting processor, to generate pixel signals corresponding to one field.

19. A device for generating pixel signals corresponding to two fields based on exposures in which electric charges are accumulated on an imaging device, said pixel signal generating device comprising:

a first pixel signal outputting processor that outputs pixel signals corresponding to one field by performing a first exposure in which said imaging device is exposed and during which an electronic flash is not radiated;

a second pixel signal outputting processor that outputs pixel signals corresponding to one field by performing a second exposure in which said imaging device is exposed and during which the electronic flash is radiated;

a third pixel signal outputting processor that outputs pixel signals corresponding to one field by performing, after said second exposure, a third exposure in which said imaging device is exposed and during which an electronic flash is not radiated, said third exposure being performed without discharging electric charges accumulated on said imaging device during said second exposure, so that said pixel signal output by said third pixel signal outputting processor corresponds to said third exposure combined with said second exposure; and a subtracting processor that subtracts said pixel signals outputted by said first pixel signal outputting processor from said pixel signals outputted by said third pixel signal outputting processor, to generate pixel signals corresponding to one field, said pixel signals generated by said subtracting processor being substantially equivalent to pixel signals obtained during an exposure in which an electronic flash is radiated.

20. A device for generating pixel signals corresponding to two fields based on exposures in which electric charges are accumulated on an imaging device, said pixel signal generating device comprising:

a first pixel signal outputting processor that outputs pixel signals corresponding to one field by performing a first exposure in which said imaging device is exposed;

a second pixel signal outputting processor that outputs pixel signals corresponding to one field by performing a second exposure in which said imaging device is exposed;

a third pixel signal outputting processor that outputs pixel signals corresponding to one field by performing, after said second exposure, a third exposure in which said imaging device is exposed, said third exposure being performed without discharging electric charges accumulated on said imaging device during said second exposure, so that said pixel signals output by said third pixel signal outputting processor correspond to said third exposure combined with said second exposure; and a subtracting processor that subtracts said pixel signals outputted by said first pixel signal outputting processor from said pixel signals outputted by said third pixel signal outputting processor, to generate pixel signals corresponding to one field.

* * * * *